(12) United States Patent
Parish

(10) Patent No.: US 8,362,747 B2
(45) Date of Patent: Jan. 29, 2013

(54) METHOD OF POWERING A MOBILE DEVICE

(75) Inventor: Robert Parish, Reading (GB)

(73) Assignee: Intel Mobile Communications GmbH, Neubiberg (DE)

( * ) Notice: Subject to any disclaimer, the term of this patent is extended or adjusted under 35 U.S.C. 154(b) by 588 days.

(21) Appl. No.: 12/207,505

(22) Filed: Sep. 10, 2008

(65) Prior Publication Data

US 2010/0060242 A1    Mar. 11, 2010

(51) Int. Cl.
*H02J 7/00* (2006.01)
(52) U.S. Cl. .......................... 320/114; 320/137
(58) Field of Classification Search .................. 320/114
See application file for complete search history.

(56) References Cited

U.S. PATENT DOCUMENTS

| | | | | |
|---|---|---|---|---|
| 4,320,333 A | * | 3/1982 | Hase | 320/159 |
| 5,563,493 A | * | 10/1996 | Matsuda et al. | 320/124 |
| 6,329,796 B1 | * | 12/2001 | Popescu | 320/134 |
| 6,348,744 B1 | * | 2/2002 | Levesque | 307/86 |
| 2007/0024243 A1 | * | 2/2007 | Liu et al. | 320/134 |
| 2008/0252262 A1 | | 10/2008 | Buhler et al. | |
| 2009/0309547 A1 | * | 12/2009 | Nakatsuji | 320/134 |

FOREIGN PATENT DOCUMENTS

| | | |
|---|---|---|
| DE | 102004057239 A1 | 6/2006 |
| EP | 0494529 A2 | 7/1992 |
| WO | 0002299 A1 | 1/2000 |

* cited by examiner

*Primary Examiner* — Arun Williams

(57) ABSTRACT

A method of operating a mobile device, an apparatus and a wireless device are provided. The method of operating a mobile device comprises receiving an external supply voltage, converting the external supply voltage into an operating voltage and operating a circuit with the operating voltage. The method may include disconnecting a rechargeable battery from the operating voltage. The method may include charging a rechargeable battery in a trickle charge manner or in a continuos manner depending on a battery voltage. An apparatus is configured to carry out the method. The method may be used by a wireless device.

8 Claims, 2 Drawing Sheets

METHOD OF POWERING A MOBILE DEVICE

TECHNICAL FIELD

Embodiments of the invention relate generally to a method of operating a mobile device, to an apparatus and to a wireless device.

DETAILED DESCRIPTION OF THE INVENTION

The following detailed description explains exemplary embodiments of the present invention. The description is not to be taken in a limiting sense, but is made only for the purpose of illustrating the general principles of the invention. The scope of the invention, however, is only defined by the claims and is not intended to be limited by the exemplary embodiments described below. Where applicable the description of a method embodiment is deemed to describe also the functioning of a corresponding device embodiment and vice versa.

When a mobile device is powered by a rechargeable battery a situation may occur where the remaining battery charge is very low which prevents a normal operation of the mobile device. In such a situation it is generally desirable to facilitate a normal operation of the mobile device as fast as possible. It is also generally desirable to resume a normal operation of the mobile device without causing undue stress to the rechargeable battery.

In accordance with embodiments of the invention, a system design and an operating scheme, respectively, of a mobile device are provided which allow the mobile device to wake up immediately, irrespective of the battery state, when connected to an external supply voltage. In the system design and the operating scheme a fast charging of a very low battery, which might cause undue stress to the battery, is avoided.

A method of operating a mobile device in accordance with an embodiment of the invention may include disconnecting a rechargeable battery from an operating voltage for use by a circuit of the device. A method of operating a mobile device in accordance with an embodiment of the invention may include charging a rechargeable battery in a trickle charge manner or in a continuos manner depending on a battery voltage.

Figure 1:
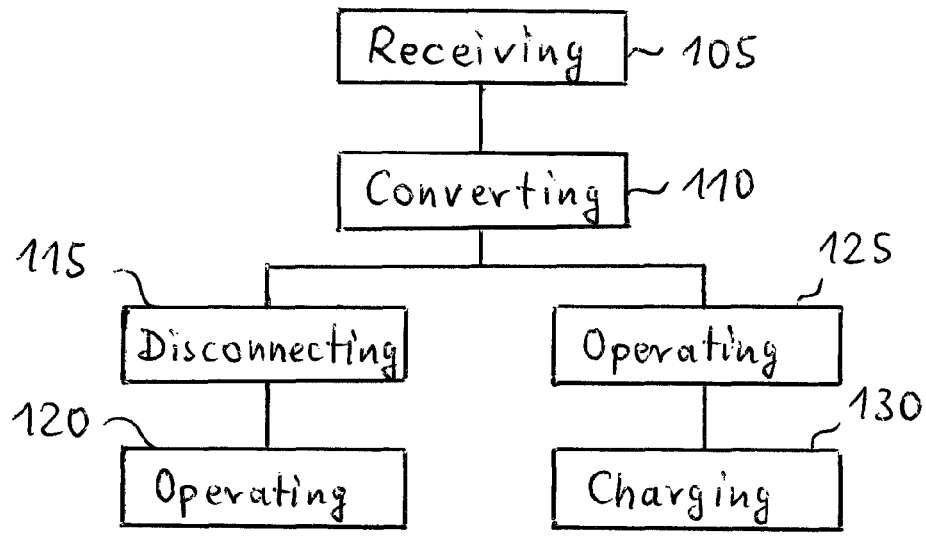
FIG. 1 shows a method of operating a mobile device in accordance with an embodiment of the invention and shows another method of operating a mobile device in accordance with another embodiment of the invention.

Referring to FIG. 1, a method of operating a mobile device in accordance with an embodiment of the invention is explained further.

In 105 an external supply voltage is received. In 110 the external supply voltage is converted into an operating voltage, the operating voltage to supply at least a circuit of the device.

In 115 a rechargeable battery configured to power the device is disconnected from both the circuit and the operating voltage upon the receiving of the external supply voltage. In 120 the circuit is operated with the operating voltage.

The disconnecting has the effect that a very low battery cannot deteriorate the operating voltage by pulling an excessive amount of charging current. This allows the circuit of the device to be supplied by the operating voltage to operate immediately even in case of a very low battery. The operating the circuit may include an operating in a time interval while the rechargeable battery is disconnected from both the circuit and the operating voltage.

Also referring to FIG. 1, another method of operating a mobile device in accordance with another embodiment of the invention is explained further.

According to that embodiment, in 105 an external supply voltage is received. In 110 the external supply voltage is converted into an operating voltage, the operating voltage to supply at least a circuit of the device.

According to that embodiment, the actions of 115 and 120 are not performed. Instead of these, in 125 the circuit is operated with the operating voltage. In 130 a rechargeable battery configured to power the device is charged with the operating voltage. The charging includes charging in a trickle charge manner if a battery voltage of the battery has a value which is below a threshold value. The charging further includes charging in a continuos manner if the battery voltage has a value which is above the threshold value.

The charging thus has the effect that a very low battery cannot deteriorate the operating voltage by pulling an excessive amount of charging current. This allows the circuit of the device to be supplied by the operating voltage to operate immediately even in case of a very low battery. The battery may be regarded as very low if the battery voltage is below the threshold value. Charging in a trickle charge manner may include a charging by discrete current pulses which are small and/or rare enough to avoid pulling an excessive amount of charging current.

According to yet another embodiment of the invention a method includes performing all of the actions of 105, 110, 115, 120, 125 and 130.

Figure 2:
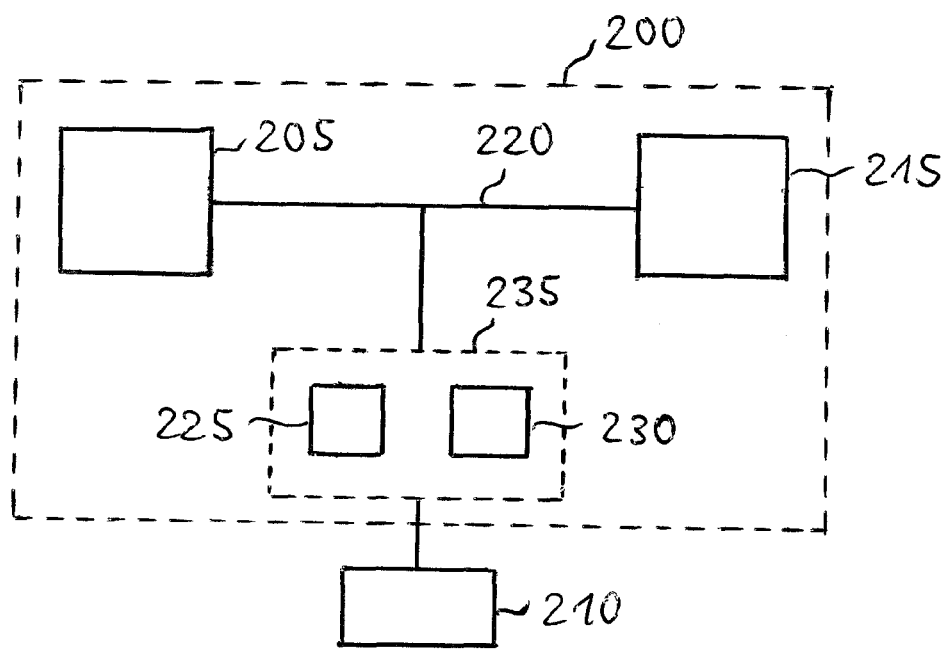
FIG. 2 shows a block diagram of an apparatus in accordance with an embodiment of the invention and shows a block diagram of another apparatus in accordance with another embodiment of the invention.

Referring to FIG. 2, a block diagram of an apparatus in accordance with an embodiment of the invention is explained further.

The apparatus 200 has a converting unit 205 configured to receive an external supply voltage at a mobile device and configured to convert the external supply voltage into an operating voltage for use by a circuit of the device. The apparatus 200 may be considered as a part of the device or as being incorporated into the device or as being attached to the device. A rechargeable battery 210 configured to power the device may be connected to the device. The battery 210 is not a part of the apparatus 200.

The apparatus 200 further has a circuit 215 configured to receive the operating voltage while the battery 210 is disconnected from both the circuit 215 and the operating voltage. The circuit 215 may receive the operating voltage via a connecting line 220 carrying the operating voltage.

The apparatus 200 furthermore has a control unit 225 configured to disconnect, upon receiving the external supply voltage with the converting unit 205, the battery 210 from both the circuit 215 and the operating voltage.

The disconnecting has the effect that a very low battery 210 cannot deteriorate the operating voltage by pulling an excessive amount of charging current. This allows the circuit 215 to operate immediately even in case of a very low battery 210.

Also referring to FIG. 2, a block diagram of another apparatus in accordance with another embodiment of the invention is explained further.

According to that embodiment, the apparatus 200 has a converting unit 205 configured to receive an external supply voltage at a mobile device and configured to convert the external supply voltage into an operating voltage for use by a circuit of the device. The apparatus 200 may be considered as a part of the device or as being incorporated into the device or as being attached to the device. A rechargeable battery 210 configured to power the device may be connected to the device. The battery 210 is not a part of the apparatus 200.

According to that embodiment, the apparatus 200 further has a circuit 215 configured to receive the operating voltage while the battery 210 is disconnected from both the circuit 215 and the operating voltage. The circuit 215 may receive the operating voltage via a connecting line 220 carrying the operating voltage.

According to that embodiment, the apparatus 200 furthermore has, instead of the control unit 225, a charging unit 230 configured to charge, with the operating voltage, the battery 210, the charging including charging in a trickle charge manner if a battery voltage of the battery 210 has a value which is below a threshold value, the charging further including charging in a continuos manner if the battery voltage has a value which is above the threshold value.

The charging thus has the effect that a very low battery 210 cannot deteriorate the operating voltage by pulling an excessive amount of charging current. This allows the circuit 215 to operate immediately even in case of a very low battery 210. The battery 210 may be regarded as very low if the battery voltage is below the threshold value. Charging in a trickle charge manner may include a charging by discrete current pulses which are small and/or rare enough to avoid pulling an excessive amount of charging current.

According to yet another embodiment of the invention the apparatus 200 includes both the control unit 225 and the charging unit 230. The control unit 225 and the charging unit 230 may be integrated into a unit 235.

According to yet another embodiment of the invention the control unit 225 may be configured to disconnect the battery 210 from the operating voltage and reconnect the battery 210 to the operating voltage repeatedly. According to yet another embodiment of the invention the control unit 225 may include a switch to facilitate charging in a trickle charge manner.

Figure 3:
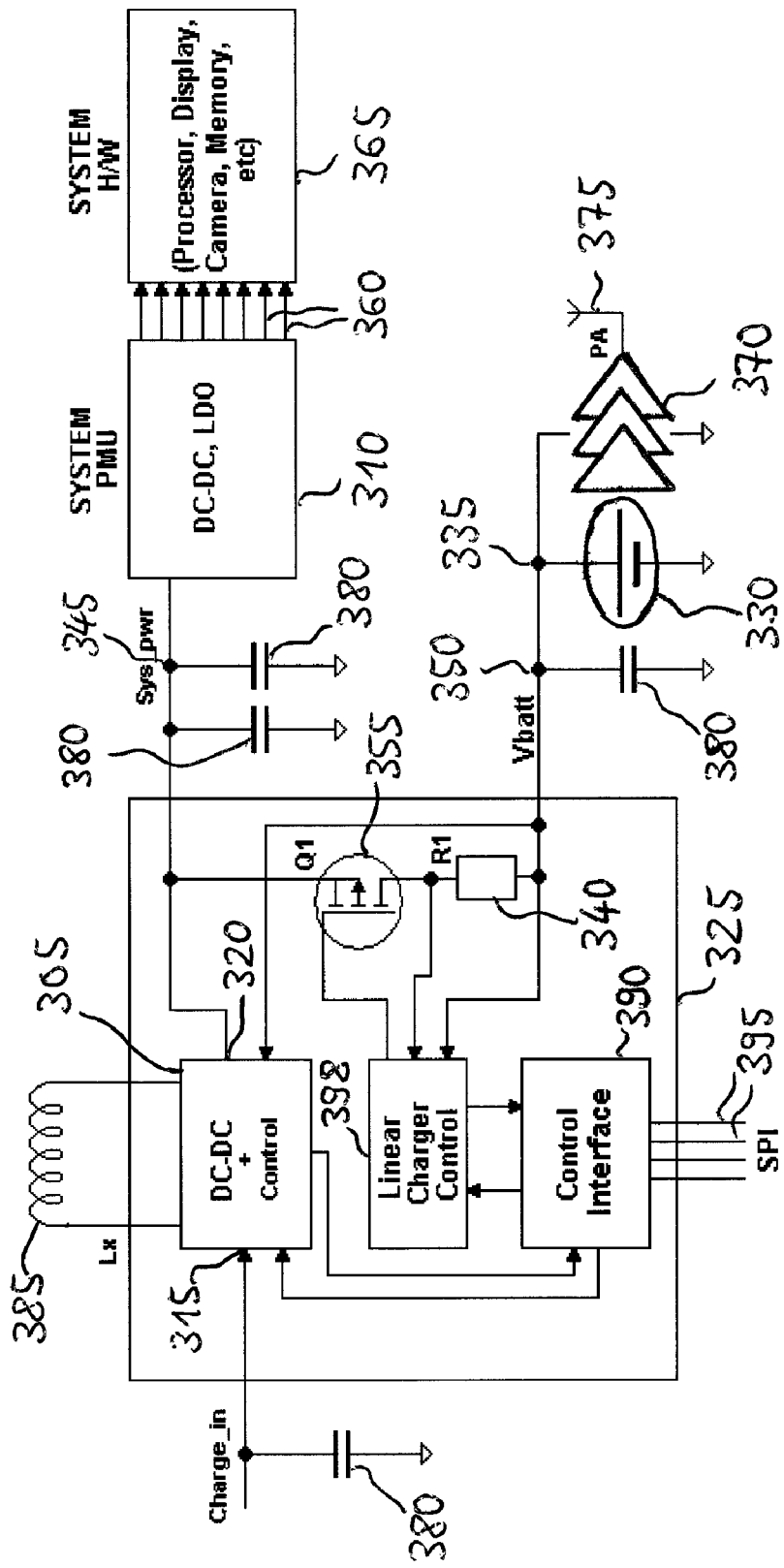
FIG. 3 shows a block diagram of a wireless device in accordance with an embodiment of the invention.

Referring to FIG. 3, a block diagram of a wireless device in accordance with an embodiment of the invention is explained further.

The wireless device 300, which is a mobile device, for example a wireless handset or a mobile phone, uses a switched mode power supply (SMPS) and a novel architecture to produce a system that allows the handset to wake up immediately—irrespective of the battery state. This is done in a manner that does not cause undue stress to the battery pack. The SMPS design, architecture and control regime also minimize the power dissipated within the device minimizing the heat generated during charging.

A mobile handset needs a significant amount of time to 'wake up' in the situation of connecting a charger when the handset main battery is very low or 'dead flat'. Typically this time can be up to several minutes.

A possible solution to provide a fast 'wake up' is to rapidly force charge the battery in order to reach the wake up threshold quickly. The battery manufacturers do not recommend fast charging a battery in a heavily discharged state. This type of force charging can cause battery cell performance degradation.

Furthermore excessive heat may be produced within the handset when fast charging batteries that are very low.

Excessive heat production may be avoided by forcing the external charging adaptor (typically a mains wall cube charger or similar) to operate in a current limited mode. This solution relies on a well defined wall cube characteristic to prevent damage to the handset. This may not be the case in the future with changes in market regulations in certain countries mandating inter-operability of chargers and mobile devices from different manufacturers.

One aspect of the wireless device 300 is the use of the switched mode power supply (SMPS) 305 to efficiently convert the applied charger voltage down to a voltage suitable for the system power management unit (PMU) 310 to be powered from directly. The SMPS 305 has an input port 315 to receive an external supply voltage and has an output port 320 to deliver an operating voltage to be supplied to the PMU 310.

The battery charger (charging unit) 325 is initially disabled, thus isolating the battery 330, which is connected to the wireless device 300 via the battery port 335, from the system power. This combination allows the handset to wake up immediately taking power from the external charging source connected to the input port 315.

Once woken up the handset system software can enable battery charging. The battery charger 325 is a linear charger. Typical linear chargers are power inefficient due to dropping the excess voltage across a linear pass element 340, 355. The excess voltage is the difference between the battery voltage and the external charging source voltage. The external charging source voltage is set high enough to ensure a battery can be fully charged. At any battery voltage less than the fully charged voltage the voltage difference can be quite large. The combination of the excess voltage and current passing through the linear pass element 340, 355 causes a large power dissipation which manifests itself as heat in the device.

The wireless device 300 incorporates a control regime whereby the output voltage of the SMPS 305 is variable. The SMPS output voltage is automatically varied to track the battery voltage with a small positive offset. The difference between the voltage at sys_pwr 345 and the voltage at Vbatt 350 is small and constant. This ensures the voltage drop across the linear pass element 340, 355 is minimized and the battery 330 is charged at the fastest allowable rate.

In order to ensure the system is able to wake up immediately, irrespective of battery state, the SMPS 305 has a set minimum permitted output voltage that the system can still support waking up from. This ensures a 'dead flat' battery (battery voltage: approx. 0 V) does not prevent the system from waking up immediately. In this circumstance trickle charging is applied which will produce a small amount of heat only in the linear pass element 340, 355 even with the elevated voltage difference and which will also not deteriorate the output voltage of the SMPS 305 since no excessive amount of charging current will be pulled by the deeply discharged battery 330 as a consequence of the trickle charging.

The wireless device 300 is described with some more details in the following.

In the absence of an external charging source the transistor Q1 355 is turned on connecting the battery 330 at Vbatt 350 to the PMU input at Sys_pwr 345. The PMU 310 provides the required power (supply voltages 360) for the system hardware 365 (circuit blocks included in the handset). A power amplifier PA 370 configured to amplify radio frequency signals and to send these signals wirelessly via the antenna 375 is not supplied with power by the PMU 310 but instead is directly connected to the battery voltage at Vbatt 350 (which is the same voltage as at the battery port 335). Several blocking capacitors 380 are provided to filter unwanted AC components out of the DC supply voltages.

When an external charging source is detected the SMPS 305, which may be realised by a DC-DC converter having an external inductor 385, converts the external charger voltage received at the input port 315 into a voltage suitable for the PMU 310 and Q1 335 is turned off. The output voltage of the DC-DC converter delivered at the output port 315 (which is the same voltage as at Sys_pwr 345) is set to be a small amount above the battery voltage at Vbatt 350 provided the battery voltage is greater than a preset threshold. If the battery voltage is less than this threshold the DC-DC output at the output port 315 is set to the minimum permitted.

With an external charger connected to the input port 315 and the DC-DC converter providing power to Sys_pwr 345 the PMU 310 provides the handset with the required power supplies (supply voltages 360) and the handset (the system hardware 365) immediately wakes up. Status registers within the control interface 390 provide feedback via the SPI interface connections 395 to the handset baseband circuitry, which is included in the system hardware 365, to indicate the situation and the system begins charging the battery—at a trickle charge if the battery 330 is deeply discharged or at a fast rate if not. The charging is controlled by the linear charger control unit 398, which controls the conductivity of the transistor Q1 355 as needed. Thus the rate of charging can be regulated. For example, the linear charger control unit 398 may switch the transistor Q1 355 on and off as needed. For example, the charging can be performed in a trickle charge manner with discrete current pulses as well as in a continuos manner at a fast charging rate.

As the battery charges the terminal voltage at 350 rises. The DC-DC converter output voltage at 320 tracks the battery voltage to maintain the small differential voltage across Q1 355 and the linear pass element (the resistor R1) 340. The voltage difference is the voltage at Sys_pwr 345 minus the voltage at Vbatt 350. This allows the charging current to be maintained at the optimal fast rate whilst minimizing heat generated in the charging process.

It should be noted that such details described in connection with the embodiment shown in FIG. 3 which are not necessarily specific for a wireless device may also be used in connection with any embodiment which does not refer to a wireless device but refers to any other mobile device.

The invention claimed is:

1. Method of operating a mobile device, comprising:
   receiving an external supply voltage;
   converting the external supply voltage into an operating voltage, the operating voltage to supply at least a circuit of the device;
   decoupling, upon the receiving of the external supply voltage, a rechargeable battery configured to power the device from both the circuit and the operating voltage;
   and operating the circuit with the operating voltage.

2. The method as recited in claim 1, further comprising:
   reconnecting the battery to the operating voltage via a charging control element; and
   charging the battery with the operating voltage via the charging control element.

3. The method as recited in claim 1, wherein the charging includes varying the charging depending on a battery voltage of the battery.

4. The method as recited in claim 1, wherein the charging includes charging the battery in a trickle charge manner.

5. The method as recited in claim 1, wherein the charging includes controlling the operating voltage to track a battery voltage of the battery with a small positive offset.

6. An apparatus, comprising:
   a converting unit to receive an external supply voltage at a mobile device and to convert the external supply voltage into an operating voltage for use by a circuit of the device;
   a control unit to decouple, upon receiving the external supply voltage, a rechargeable battery configured to power the device from both the circuit and the operating voltage;
   the circuit receiving the operating voltage while the rechargeable battery is disconnected from both the circuit and the operating voltage.

7. The apparatus as recited in claim 6, further comprising:
   a charging control element to reconnect the battery to the operating voltage; and a charging unit to charge the battery with the operating voltage via the charging control element.

8. A wireless device, comprising:
   a power supply having an input port to receive an external supply voltage and having an output port to deliver an operating voltage;
   a battery port to receive and connect a rechargeable battery configured to power the wireless device;
   a power management circuit connected to the output port and to the battery port and configured to be powered by the output voltage or the rechargeable battery, the power management circuit further configured to deliver one or more supply voltages for use by one or more circuits of the wireless device;
   a switch to decouple, upon receiving the external supply voltage, the battery port from both the power management circuit and the operating voltage, and to reconnect the battery port to the operating voltage;
   and a charging unit to charge the battery with the operating voltage if the battery port is connected to the operating voltage via the switch.

* * * * *